US008428033B2

(12) United States Patent
Hettstedt et al.

(10) Patent No.: US 8,428,033 B2
(45) Date of Patent: Apr. 23, 2013

(54) RADIO FREQUENCY NETWORK

(75) Inventors: Heinz-Dieter Hettstedt, Isernhagen (DE); Robert Zorad, Burgdorf (DE); Axel Schroeder, Nordsehl (DE); Gerd Klauke, Hannover (DE); Ekkehard Schomburg, Burgwedel (DE)

(73) Assignee: Alcatel Lucent, Paris (FR)

( * ) Notice: Subject to any disclaimer, the term of this patent is extended or adjusted under 35 U.S.C. 154(b) by 643 days.

(21) Appl. No.: 12/548,899

(22) Filed: Aug. 27, 2009

(65) Prior Publication Data

US 2010/0054227 A1 Mar. 4, 2010

(30) Foreign Application Priority Data

Aug. 28, 2008 (EP) ..................................... 08290805

(51) Int. Cl.
*H04W 4/00* (2006.01)

(52) U.S. Cl.
USPC .......................................... 370/334; 370/485

(58) Field of Classification Search ........................ None
See application file for complete search history.

(56) References Cited

U.S. PATENT DOCUMENTS

| 5,457,811 A | 10/1995 | Lemson |
| 5,615,034 A * | 3/1997 | Hori ............................... 398/158 |
| 5,657,374 A * | 8/1997 | Russell et al. ................. 370/328 |
| 5,737,687 A | 4/1998 | Martin et al. |
| 5,809,395 A | 9/1998 | Hamilton-Piercy et al. |
| 6,337,754 B1 * | 1/2002 | Imajo ............................ 398/115 |
| 7,403,742 B2 * | 7/2008 | Shklarsky et al. ............. 455/14 |

FOREIGN PATENT DOCUMENTS

| EP | 1 860 803 A1 | 11/2007 |
| GB | 2 354 674 A | 3/2001 |
| JP | 2006325004 A | 11/2006 |

OTHER PUBLICATIONS

European Search Report.
Official European Communication, Application No. 08 290 805.4-1249, Dec. 11, 2009.
Official European Communication, Application No. 08 290 805.4-1249, Aug. 30, 2010.

* cited by examiner

*Primary Examiner* — Jianye Wu
(74) *Attorney, Agent, or Firm* — Fay Sharpe LLP

(57) ABSTRACT

The present invention relates to radio frequency (RF) distribution systems for mobile communications. In particular, the present invention relates to a radio frequency network facilitating radio communication where the usual free space propagation of electromagnetic waves is hampered, undesired or impossible, for example in tunnels, mines, and buildings and in large complexes like exhibition grounds, shopping malls, and airports. The radio frequency network comprises a distributed antenna system having radiating elements, a wired distribution system feeding the distributed antenna system, at least one antenna amplifier between one end of the wired distribution system and the distributed antenna system, at least one line amplifier at the other end of the wired distribution system, and automatic self-leveling units included in the antenna and line amplifiers.

19 Claims, 3 Drawing Sheets

RADIO FREQUENCY NETWORK

The invention is based on a priority application EP 08 290 805.4 which is hereby incorporated by reference.

TECHNICAL FIELD

The present invention relates to radio frequency (RF) distribution systems for mobile communications. In particular, the present invention relates to a radio frequency network facilitating radio communication where the usual free space propagation of electromagnetic waves is hampered, undesired or impossible, for example in tunnels, mines, and buildings and in large complexes like exhibition grounds, shopping malls, and airports.

BACKGROUND OF THE INVENTION

In this regard, WINS is a known term. WINS stands for Wireless Indoor Solutions offering to customers RF communication systems for confined areas. It enables users to use their mobile radios and cellular phones in areas normally not covered with RF signals. The aim of such communication systems is to distribute cellular services using a cost-efficient and broadband infrastructure, wherein the desired cellular services can be distributed over different frequency bands (e.g. GSM900, GSM1800, UMTS2100, SMR800, CDMA800, PCS1900, WiMax2500, etc.).

However, the need for a service can change over time, and one service can be switched-off while another one has to be switched-on. Also technology evolution (e.g. from GSM900 via UMTS to WiMax) makes an easy upgrade of the services in such communication system necessary. In general, said systems are exposed to the following challenges (e.g. inside buildings): distribution of multi-band cellular services; distribution of multi-operator cellular services; cost-efficient broadband infrastructure that allows for distribution of cellular services independent of the frequency allocation; enabling an easy upgradeability to other frequency bands or combinations and an extension of the coverage area; distribution of frequency bands that directly border or that have overlapping frequency bands (especially for the FCC (Federal Communications Commission) services in the US).

State-of-the-art multi-service communication systems make use of several large-scale and expensive solutions to solve the technical problems mentioned above. The most common way is the use of high-end filters and duplexers to provide sufficient isolation between the services. Further solutions propose the installation of a parallel infrastructure for each service. Still further solutions propose a frequency conversion technology in order to save the effort of filtering in the RF domain resulting in several technical problems e.g. frequency accuracy and stability. Basically, conventional solutions can be divided into three main categories, namely passive systems, active systems, and hybrid systems. In the following, the principle of such systems is outlined.

In known passive systems signals from a centralized source, e.g. Base Transceiver Station (BTS) or Node B or off-air repeater, are combined via a point of interconnection (POI) and fed directly to a coaxial distribution system. The coaxial distribution system can consist of coaxial cables, couplers and RF splitters. Such passive distribution system feeds a distributed antenna system (DAS) consisting of antennas and/or radiating cables. However, the following problems arise from the known passive systems. A coverage area is restricted depending on the output power level of the active equipment and of the high passive losses of the passive distribution network and DAS. That is, the losses of the distribution infrastructure have to be compensated by high output power level of the active equipment, for example the signal source. Furthermore, the extension of such systems to larger coverage areas is complicated, because a second BTS/Node B location has to be installed in confined areas (e.g. in a building) as well as a second independent distribution topology. In addition, a sectorization and capacity optimization has to be chosen carefully during system design. For example, it is not possible to change the sectorization inside a building after the installation. A further problem of known passive systems is that depending on the frequency allocation of the cellular services a high effort for RF filtering is required in case of bordering services. A distribution of overlapping services is only possible if individual infrastructures for uplink (UL) and downlink (DL) bands or a combination thereof is used. That is, in such case two separate networks are used to transmit suitable combinations of UL and DL RF bands.

In known active systems signals from a signal source, e.g. BTS or Node B or off-air repeater, are combined via a point of interconnection and distributed in a RF network comprising cables and antennas, similar to the above-described passive systems. The RF losses are compensated mostly in bi-directional amplifiers or amplifier cascades, for example depending on the network size. In complicated cases of frequency allocations, individual networks for UL and DL are used or combinations of both. However, the following problems arise from the known active systems. The RF losses of the distribution infrastructure have to be compensated by a high output power level of the active equipment, e.g. bi-directional amplifiers. For several services such bidirectional amplifiers must be combined with additional (band-selective) filter elements. However, such solution results in high costs and therefore the number of bi-directional amplifiers must be optimized and the need of high-end RF infrastructure with low RF losses is the consequence. In addition, in most of the known active systems intermodulations are generated which are difficult to avoid.

Also in known hybrid systems signals from a signal source, e.g. BTS or Node B or off-air repeater, are combined via a point of interconnection and fed to a master unit, which includes a conversion of the analogue RF signal into an optical signal in DL. By the use of optical fibers and specific electro-optical units high RF losses in larger RF networks are avoided and large distances can be overcome. The optical signal is distributed via the optical fibers in the confined area. A remote unit re-converts the optical signal into the original RF signal, which is amplified afterwards. The amplified RF signal is distributed via passive DAS. For UL the system works vice versa, including RF to optical conversion in the remote unit and optical to RF conversion in the master unit. However, the following problems arise from hybrid systems. Due to fiber-optical signal distribution and due to expensive installation costs for optical fibers a high installation effort is required. Compared to passive systems the same effort for RF filtering has to be implemented in the remote units in order to isolate the uplink and the downlink of the systems. Furthermore, the design of multi-service systems is often only possibly by parallelization of each service in order to avoid interferences. Thus, the costs for purchasing and installation of multi-service hybrid systems are very high. Furthermore, optical systems produce high system noise reducing the system dynamic range. In addition, it is difficult to optimize the system dynamic range between limitations of noise and intermodulations.

Consequently, all analogue system solutions need a careful signal leveling to provide sufficient radiated power for requested coverage and to avoid eventual intermodulations due to possible over-drive of active units. In addition, network extensions are mostly complicated due to re-configurations and new signal leveling.

It is therefore an object of the present invention to provide an improved signal transmission in a radio frequency network which avoids intermodulations and which reduces the effort for network commissioning and testing when installing the network for the first time and when extending the network.

This object and other objects are solved by the features of the independent claims. Preferred embodiments of the invention are described by the features of the dependent claims.

SUMMARY OF THE INVENTION

A radio frequency network is provided, comprising a distributed antenna system having radiating elements, a wired distribution system feeding the distributed antenna system, at least one antenna amplifier between one end of the wired distribution system and the distributed antenna system, and at least one line amplifier at the other end of the wired distribution system. According to the present invention automatic self-leveling units are included in the antenna and line amplifiers.

The automatic self-leveling units according to the present invention provide for an automatic self-leveling functionality over the whole network structure. In particular, it is possible to automatically compensate for RF network losses, to avoid an over-drive if the number of RF carriers is increased, and to avoid intermodulations. In addition, network extensions in size can be achieved easily, since new amplifier modules adopt additional RF losses automatically. Thus, the present invention provides for a new type of cost-efficient solution of active RF networks, which can be used in plug-and-play function during commissioning. In particular, an effort for installation, commissioning, and any modification of the system is minimized, because time consuming manual leveling of the system is not required. In addition, the present invention enables an increase of high frequency carriers.

According to a preferred embodiment of the present invention the automatic self-leveling units are adapted to provide a fixed output signal level for a received signal level range. Preferably, the dynamic range of the automatic self-leveling units and their reaction time can be initially adjusted to each other so that the whole network operates in a balanced way providing defined signal levels at the amplifier outputs. Thus, within a certain signal range at the input of the self-leveling units, no commissioning and testing effort is necessary every time a network parameter is changed, e.g. a new signal carrier is introduced, or aging and temperature effects cause a signal loss or gain. Once the radio frequency network has been installed and set into operation, costly monitoring equipment and maintenance personnel for commissioning and testing can be saved.

Basically, the antenna amplifier amplifies uplink and downlink signals. Download signals are amplified in order to provide sufficient coverage for a dedicated coverage area. Furthermore, the antenna amplifier provides for compensation of losses of the wired distribution system in download and low noise amplification of uplink signals. An automatic self-leveling unit of the antenna amplifier provides a limiting function in uplink in order to protect the whole radio frequency network against non-linear signals resulting from high input power levels. In particular, in uplink the dynamic range is automatically optimized, since incoming power levels from different distributed antenna systems are adjusted to a constant value. Furthermore, low-priced technology can be used in the amplifiers, since the high frequency energy is generated directly at the antennas. In contrast thereto, prior art systems require high-level technology in concentrated amplifiers or base stations at the entry of the network. The line amplifier optimizes the dynamic range of the network and compensates for RF losses resulting from the passive distribution system independently of the distribution. Furthermore, in downlink the line amplifier provides for automatic and independent leveling of the antenna amplifier in order to level the input signals from each path to an equal output power level resulting in a maximized and constant dynamic range. In addition, in downlink the line amplifier increases a power level of an input signal to a constant output power level. The wired distribution system attenuates this power level and the loss is dependent on the network architecture. The automatic level control inside the antenna amplifier compensates for the loss of the distribution system and produces a constant output power level. Thus, in combination with a line amplifier compensating passive losses of the distribution system a plug-and-play system operation is guaranteed.

According to a further embodiment of the present invention the antenna and line amplifiers comprise multiplexers for separating and/or combining upload and download frequency bands. That is, an incoming broadband signal is separated into a plurality of narrowband signals and each narrowband signal is amplified by a separate narrowband amplifier. In other words, the antenna and line amplifiers comprise a plurality of narrowband amplifiers corresponding to the upload and download frequency bands. By isolating the uplink and downlink frequency bands it is possible to avoid any interactions. In addition, low cost elements can be used in the antenna and line amplifiers due to low power levels based on distributed antenna amplifiers.

The present invention enables an easy implementation of additional services. For example, new filter elements can be combined with existing network elements via splitters and all increased RF losses will be compensated automatically. Furthermore, the present invention is applicable to a distribution of single- or multi-band cellular services in confined areas (e.g. in buildings) independently of the frequency allocation. In addition, the wired distribution system preferably comprises broadband elements (e.g. coaxial cables) so that an existing infrastructure can be expanded with future services such as WiMax (FDD and TDD services). Thus, the present invention provides a broadband approach suitable for all frequency combinations between 100 MHz and 3.5 GHz. An extension to 6 GHz is possible by use of high performance coaxial cables.

In particular, the present invention provides for a cost-effective solution with plug-and-play functionality to distribute mobile services in confined areas (e.g. in buildings). The wired distribution system preferably consists of passive low-cost elements as coaxial cables, splitters, and combiners. Active elements are only arranged at both ends of the wired distribution system, that is, at its input (e.g. point of interconnection) and output (e.g. radiating elements). Thus, the wired distribution system can be easily extended. If such extension is terminated by a radiating element, an antenna amplifier according to the present invention is provided between said extended distribution system and said new radiating element, so that the automatic self-leveling unit of said new antenna amplifier automatically balances said extension with the remaining network. Thus, commissioning costs are considerably reduced.

Usually, any adaptation or upgrade of the network to new conditions and/or settings only impacts the architecture of active system elements. The wired distribution system needs not to be changed. Thus, the self-leveling plug-and-play system according to the present invention is more flexible and consequently more cost-effective in comparison with known system architectures.

These and other aspects of the present invention will be apparent from and elucidated with reference to the embodiments thereafter. It should be noted that the use of reference signs shall not be construed as limiting the scope of the invention.

DETAILED DESCRIPTION OF PREFERRED EMBODIMENTS

Figure 1:
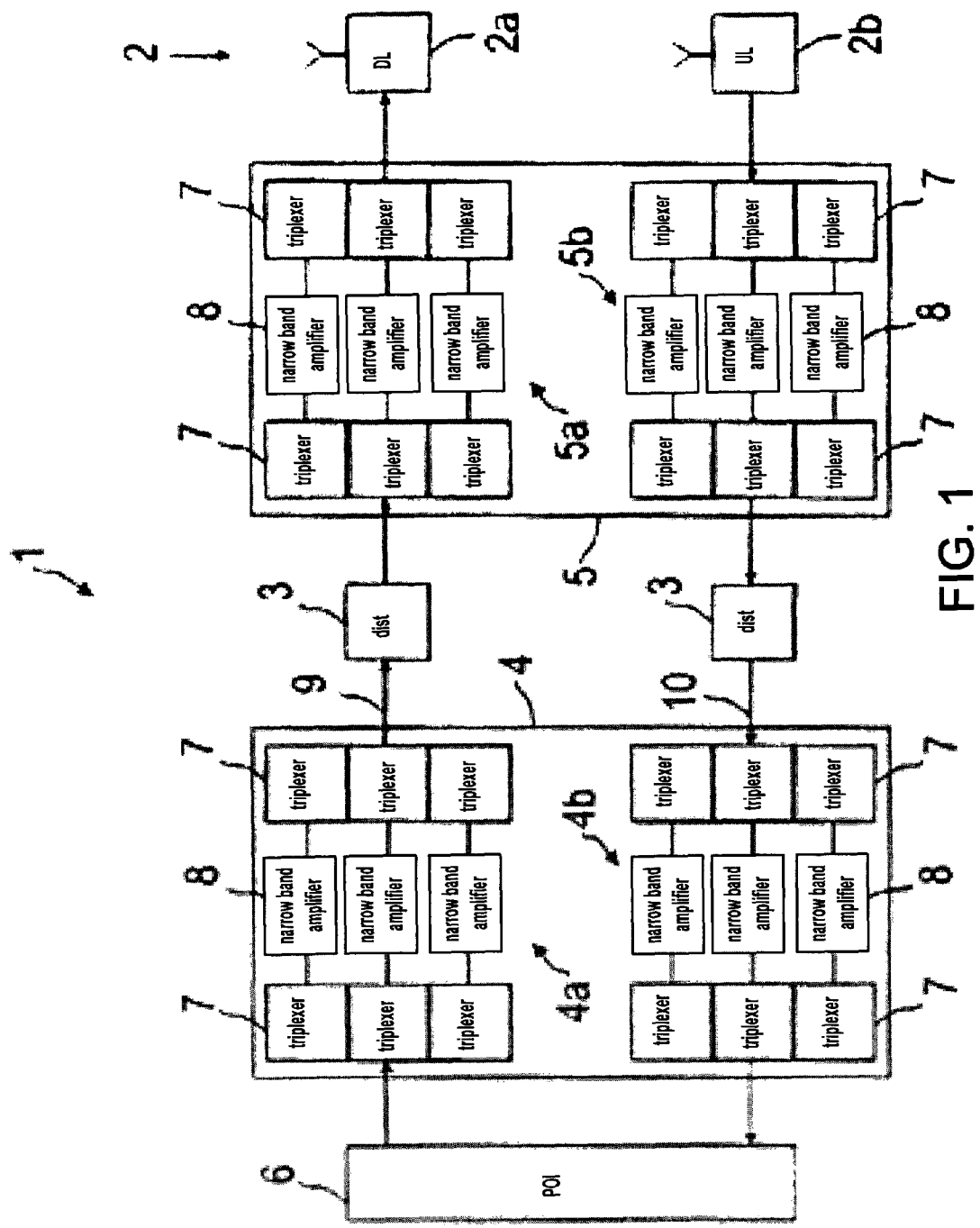
FIG. 1 shows a block diagram of a first embodiment of a radio frequency network according to the present invention.

FIG. 1 shows a block diagram of a first embodiment of a radio frequency network 1 according to the present invention. The radio frequency network 1 comprises a distributed antenna system 2 having radiating elements (not shown) and a wired distribution system 3 feeding the distributed antenna system 2. Furthermore, the shown radio frequency network 1 comprises a line amplifier 4 at one end of the wired distribution system 3 and an antenna amplifier 5 at the other end thereof. Signals from a centralized source (not shown), e.g. Base Transceiver Station (BTS) or Node B or off-air repeater, are combined via a point of interconnection 6 (POI) and fed to the wired distribution system 3 via the line amplifier 4. The radio frequency network 1 shown in FIG. 1 is bidirectional. That is, signals received by the distributed antenna system 2 are transmitted via the antenna amplifier 5, the wired distribution system 3, and the line amplifier 4 to the point of interconnection 6.

The radio frequency network 1 according to the present invention allows for distribution of cellular services independently of the frequency allocation in confined areas. For example, if the network 1 is used in buildings (in-building mobile communication systems) or tunnels, the wired distribution system 3 exclusively comprises passive components like broadband coaxial cables as transmission lines, splitters (not shown) and combiners (not shown). This allows using the same distribution system independently of the services that are to be transmitted. In case of an upgrade of the radio frequency network 1 to provide modern in-building solutions for cellular services only active network elements have to be exchanged, e.g. band selective filters. This minimizes the effort to upgrade the network in terms of exchanging active elements (e.g. line and antenna amplifiers 4, 5) or at least the filters within these elements.

The antenna amplifier 5 feeds the radiating elements (e.g. discrete antennas and/or radiating cables) of the distributed antenna system 2 and provides sufficient output power level to support single- or multi-carriers in downlink, that is from the distributed antenna system for downlink 2a to mobile terminals (not shown). An automatic level control (not shown) in the antenna amplifier 5 compensates for losses of the passive distribution system 3 between line and antenna amplifiers 4, 5 resulting in a constant output power level independent of RF losses and network topology.

In order to provide the desired input power level to the downlink part 5a of the antenna amplifier 5, the line amplifier 4 is implemented in the network architecture. The line amplifier 4 compensates for losses of the POI 6 and the passive distribution system 3 regulating the input power level to the antenna amplifier 5 to desired power levels suitable for the automatic level control (e.g. by automatic self-leveling units) of the antenna amplifier 5.

In uplink, that is, from the distributed antenna system for uplink 2b to the POI 6, the RF path works vice versa. Signals are collected by the distributed antenna system for uplink 2b and fed to the uplink part 5b of the antenna amplifier 5. An automatic level control (not shown) in the uplink part 5b of the antenna amplifier 5 adjusts the signals from mobile terminals (not shown) in order to maximize the system dynamic range and optimizes the system performance. As shown in FIG. 1, signals from the distributed antenna system for uplink 2b are combined and transmitted to the uplink part 5b of the antenna amplifier 5. Preferably, the signals from the radiating elements of the distributed antenna system for uplink 2b are passively combined and automatically leveled as well as re-amplified by the antenna amplifier 5. The uplink part 4b of the line amplifier 4 compensates losses of the passive distribution system 3 between antenna and line amplifiers 4, 5 as well as differences in the received power levels, e.g. from individual floors in case that the shown network is an in-building radio frequency network.

The line and antenna amplifiers 4, 5 shown in FIG. 1 are multi-band amplifiers comprising triplexers 7 and corresponding narrowband amplifiers 8. The architecture of the line and antenna amplifiers 4, 5 as shown in FIG. 1 is designed for a parallel network. That is, the network comprises separate downlink and uplink paths 9, 10 and the amplifiers 4, 5 comprise separate uplink and downlink parts 4a, 4b, 5a, 5b subdivided into a plurality of frequency bands. Such multi-band amplifiers are applicable for most mobile communication systems where download frequency bands as well as uplink frequency bands can be separated and combined via low cost multiplexers. According to the present invention it is possible to distribute adjacent or overlapping frequency bands for uplink and downlink (e.g. SMR800 and CDMA800) or overlapping frequency bands (e.g. PCS1900 and UMTS2100), for example in an in building mobile communication system. In this case, the combining of downlink/uplink frequency bands via filters to a common port is not possible.

Because of the separation of the distributed antenna system 2 (radiating elements) for uplink and downlink 2a, 2b the effort for filtering decreases considerably. Low-cost filter technology (e.g. ceramic filters and duplexers and/or SAW filters) can be used to separate and combine services. That is, separate RF networks are used for uplink and downlink to enable a cost-reduction due to cost-efficient filter technology. Furthermore, the passive network architecture can be adapted to each topology, e.g. in buildings, without reduction of performance.

Figure 2:
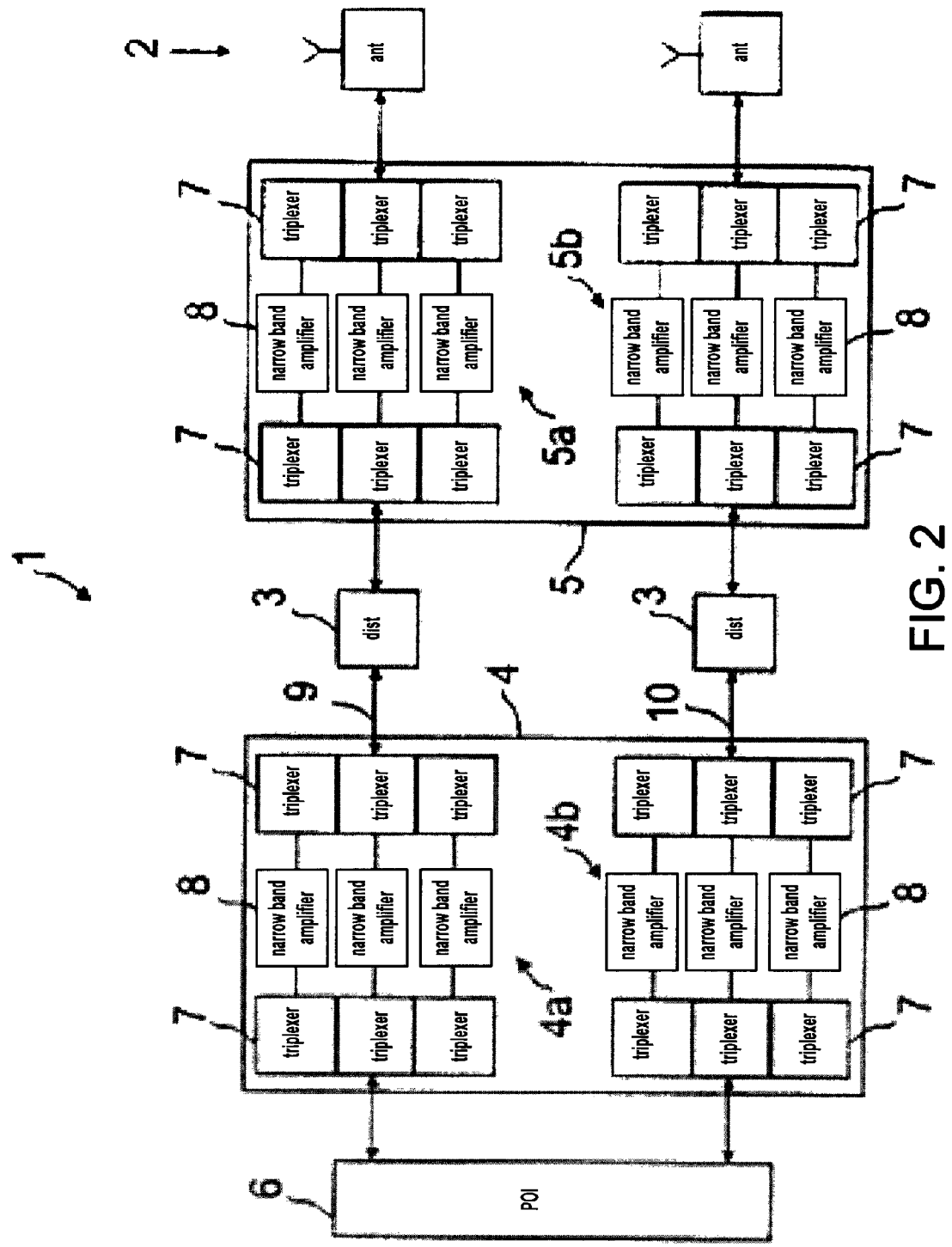
FIG. 2 shows a block diagram of a second embodiment of a radio frequency network according to the present invention.

FIG. 2 shows a block diagram of a second embodiment of a radio frequency network according to the present invention. In comparison with FIG. 1 only the architecture of the line and antenna amplifiers 4, 5 is modified. In case of adjacent or overlapping frequency bands, one uplink and one downlink band are interchanged. Thus, the downlink parts 4a, 5a of the amplifiers 4, 5 of FIG. 1 comprise two downlink bands and one uplink band in FIG. 2, whereas the uplink parts 4b, 5b of the amplifiers 4, 5 of FIG. 1 comprise two uplink bands and one downlink band in FIG. 2. In other words, one amplifier part 4a, 5a amplifies two downlink bands and one uplink band and vice versa for the second amplifier part 4b, 5b, which transmits two uplink frequency bands and one downlink band over the distribution system 3. This anti-parallel architecture according to the second embodiment of the present invention again allows for the use of low cost filter technology due to the separation of frequency bands that are critical to combine. That is, the anti-parallel architecture allows for distribution of bordering or overlapping frequency bands without the use of high performance filters and multiplexers. In particular, the physical separation of radiating elements (not shown) of the distributed antenna system 2 provides sufficient isolation between adjacent or overlapping frequency bands taken into account at decoupling of radiating elements. The modular design of the active elements as described with respect to FIGS. 1 and 2 allows for an easy network design independently of the frequency spectrum of required mobile services.

In a modification (not shown) of the above embodiments a cascading of line amplifiers allows interconnecting of RF sub-systems consisting of line amplifiers, a wired distribution system, antenna amplifiers and a distributed antenna system. The cascaded line amplifier compensates in each case the passive losses between active elements and provides a suitable input power level for the automatic level control of line and antenna amplifiers, respectively. In addition, low-priced high frequency cables can be used in the distribution system by the cascading of line amplifiers.

Figure 3:
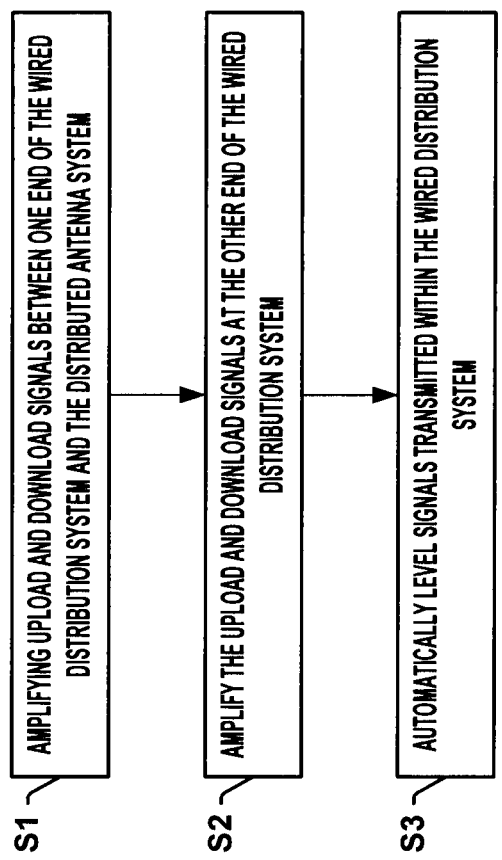
FIG. 3 shows a flow chart of a method according to the present invention.

FIG. 3 shows a flow chart of a method according to the present invention for signal transmission within a radio frequency network. The radio frequency network comprises a distributed antenna system having radiating elements and a wired distribution system feeding the distributed antenna system. In a first step S1 at least one antenna amplifier, arranged between one end of the wired distribution system and the distributed antenna system, amplifies upload and download signals. In a second step S2 at least one line amplifier, arranged at the other end of the wired distribution system than the antenna amplifier, also amplifies the upload and download signals. In a third step S3 self-leveling units included in the antenna and line amplifiers automatically level signals transmitted within the wired distribution system. The order of the steps S1 to S3 is not limited to the above described order. For example, steps S1 and S2 can be exchanged with each other, depending of the respective signal direction (uplink or downlink).

The invention claimed is:

1. A radio frequency network, comprising:
    a distributed antenna system comprising a plurality of physically separated radiating elements;
    a wired distribution system feeding the distributed antenna system;
    at least one antenna amplifier between one end of the wired distribution system and the distributed antenna system;
    at least one line amplifier at the other end of the wired distribution system; and
    automatic self-leveling units included in the antenna and line amplifiers.

2. The radio frequency network according to claim 1, wherein the automatic self-leveling units are adapted to provide a fixed output signal level for a received signal level range.

3. The radio frequency network according to claim 1, wherein the antenna and line amplifiers comprise multiplexers for separating and/or combing upload and download frequency bands.

4. The radio frequency network according to claim 1, wherein the wired distribution system comprises broadband coaxial cables, splitters, and combiners.

5. The radio frequency network according to claim 1, wherein the distributed antenna system consists of discrete antennas and/or radiating cables.

6. A method for signal transmission within a radio frequency network, the network comprising a distributed antenna system having a plurality of physically separated radiating elements and a wired distribution system feeding the distributed antenna system, the method comprising:
    amplifying upload and download signals in at least one antenna amplifier arranged between one end of the wired distribution system and the distributed antenna system;
    amplifying the upload and download signals in at least one line amplifier arranged at the other end of the wired distribution system; and
    automatically self-leveling of signals transmitted within the wired distribution system in the antenna and line amplifiers by means of self-leveling units.

7. The method according to claim 6, wherein the self-leveling units provide a fixed output signal level for a received signal level range.

8. The method according to claim 6, further comprising the step of separating and/or combining of upload and download frequency bands in the antenna and line amplifiers by means of multiplexers.

9. The radio frequency network according to claim 1 incorporated in a communication system comprising at least one mobile terminal.

10. The radio frequency network according to claim 1, wherein the plurality of physically separated radiating elements of the distributed antenna system are antennas and/or radiating cables.

11. A radio frequency network, comprising:
    a distributed antenna system having radiating elements;
    a wired distribution system feeding the distributed antenna system;
    at least one antenna amplifier between one end of the wired distribution system and the distributed antenna system;
    at least one line amplifier at the other end of the wired distribution system; and
    automatic self-leveling units included in the antenna and line amplifiers;
    wherein the at least one antenna amplifier comprises a first part and a second part;
    wherein the first part comprises means for amplification of two downlink bands and one uplink band; and
    wherein the second part comprises means for amplification of two uplink bands and one downlink band.

12. The radio frequency network according to claim 11, wherein the first and the second part are separated from each other.

13. The radio frequency network according to claim 12, wherein the wired distribution system comprises broadband coaxial cables, splitters, and combiners.

14. The radio frequency network according to claim 13, wherein the distributed antenna system comprises a plurality of antennas and/or radiating cables.

15. The radio frequency network according to claim 12:
    wherein the at least one line amplifier comprises a third part and a fourth part;
    wherein the third part comprises means for amplification of two uplink bands and one downlink band; and
    wherein the fourth part comprises means for amplification of two downlink bands and one uplink band.

16. The radio frequency network according to claim 15, wherein the third and the fourth parts are separated from each other.

17. The radio frequency network according to claim 16, wherein the wired distribution system comprises broadband coaxial cables, splitters, and combiners.

18. The radio frequency network according to claim 17, wherein the distributed antenna system comprises a plurality of antennas and/or radiating cables.

19. A radio frequency network, comprising:
- a distributed antenna system having radiating elements;
- a wired distribution system feeding the distributed antenna system;
- at least one antenna amplifier between one end of the wired distribution system and the distributed antenna system;
- at least one line amplifier at the other end of the wired distribution system; and
- automatic self-leveling units included in the antenna and line amplifiers;
- wherein the distributed antenna system comprises a plurality of antennas and/or radiating cables.

* * * * *